United States Patent
Johnsson et al.

(10) Patent No.: US 10,111,118 B2
(45) Date of Patent: Oct. 23, 2018

(54) NETWORK ASSISTANCE FOR DEVICE-TO-DEVICE DISCOVERY

(71) Applicant: Intel Corporation, Santa Clara, CA (US)

(72) Inventors: Kerstin Johnsson, Palo Alto, CA (US); Muthaiah Venkatachalam, Beaverton, OR (US); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 14/695,930

(22) Filed: Apr. 24, 2015

(65) Prior Publication Data

US 2015/0305077 A1    Oct. 22, 2015

Related U.S. Application Data

(63) Continuation of application No. 13/718,745, filed on Dec. 18, 2012, now Pat. No. 9,036,603.

(Continued)

(51) Int. Cl.
*H04B 7/00* (2006.01)
*H04W 24/04* (2009.01)
(Continued)

(52) U.S. Cl.
CPC ............ *H04W 24/04* (2013.01); *H04B 17/27* (2015.01); *H04L 5/00* (2013.01); *H04L 5/0035* (2013.01);
(Continued)

(58) Field of Classification Search
CPC ... H04W 4/005; H04W 76/023; H04W 4/008; H04W 4/021
(Continued)

(56) References Cited

U.S. PATENT DOCUMENTS 5,754,638 A    5/1998  Kusunoki
6,580,704 B1 *  6/2003  Wellig .............. H04L 29/12009
                                                        370/338
(Continued)

FOREIGN PATENT DOCUMENTS

CN    101491147 A    7/2009
CN    102244855 A    11/2011
(Continued)

OTHER PUBLICATIONS

"[Draft] LS on Tsp", TSG-CT-WG3: 3GPP Draft; C3-121281_LS_ON_TSP-Draft, 3RD Generation Partnership Project (3GPP), Mobile Competence Centre; 650, Route Des Lucioles ; F-06921 Sophia-Antipolis Cedex; France, vol. CT WG3, no. Kyoto, Japan; May 21, 2012-May 25, 2012, (May 29, 2012), 2 pgs.

(Continued)

*Primary Examiner* — Ricky Ngo
*Assistant Examiner* — Dewanda Samuel
(74) *Attorney, Agent, or Firm* — Schwegman Lundberg & Woessner, P.A.

(57) ABSTRACT

Embodiments of system and method configurations for device discovery and connection establishment in connection with use of device-to-device (D2D) and proximity-based services are generally described herein. In some examples, an evolved packet core (EPC) of a 3GPP Long Term Evolution or 3GPP Long Term Evolution-Advanced (LTE/LTE-A) network is arranged to assist D2D identification and discovery procedures at user equipment (UEs) connected to the LTE/LTE-A network. Various identification and discovery procedures may be implemented in connection with proximity detection and the establishment of communication times for the establishment of the D2D communication link, between the UEs. Accordingly, the EPC of the LTE/LTE-A network may assist the establish- (Continued)

ment of a device-to-device communication link between UEs on a wireless network employing a distinct wireless protocol (for example, a direct wireless network connection via a wireless local area network (WLAN) or wireless personal area network (WPAN)).

21 Claims, 8 Drawing Sheets

Related U.S. Application Data

(60) Provisional application No. 61/679,627, filed on Aug. 3, 2012.

(51) Int. Cl.

| | | |
|---|---|---|
| H04W 28/02 | (2009.01) | |
| H04W 52/00 | (2009.01) | |
| H04L 5/00 | (2006.01) | |
| H04L 12/24 | (2006.01) | |
| H04L 12/26 | (2006.01) | |
| H04L 12/807 | (2013.01) | |
| H04L 29/06 | (2006.01) | |
| H04L 29/08 | (2006.01) | |
| H04W 4/00 | (2018.01) | |
| H04W 8/18 | (2009.01) | |
| H04W 28/04 | (2009.01) | |
| H04W 36/00 | (2009.01) | |
| H04W 40/34 | (2009.01) | |
| H04W 52/02 | (2009.01) | |
| H04W 72/00 | (2009.01) | |
| H04W 72/04 | (2009.01) | |
| H04W 76/02 | (2009.01) | |
| H04W 24/02 | (2009.01) | |
| H04N 21/2343 | (2011.01) | |
| H04N 21/258 | (2011.01) | |
| H04W 40/02 | (2009.01) | |
| H04W 16/18 | (2009.01) | |
| H04W 76/04 | (2009.01) | |
| H04W 24/10 | (2009.01) | |
| H04W 4/02 | (2018.01) | |
| H04W 12/06 | (2009.01) | |
| H04W 64/00 | (2009.01) | |
| H04W 88/06 | (2009.01) | |
| H04L 12/703 | (2013.01) | |
| H04B 17/27 | (2015.01) | |
| H04W 74/08 | (2009.01) | |
| H04W 16/28 | (2009.01) | |
| H04W 36/14 | (2009.01) | |
| H04W 88/12 | (2009.01) | |
| H04W 92/18 | (2009.01) | |

(52) U.S. Cl.
CPC ........ *H04L 5/0057* (2013.01); *H04L 41/0659* (2013.01); *H04L 41/0836* (2013.01); *H04L 43/0811* (2013.01); *H04L 45/28* (2013.01); *H04L 47/27* (2013.01); *H04L 65/1006* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 4/005* (2013.01); *H04W 4/008* (2013.01); *H04W 4/02* (2013.01); *H04W 8/18* (2013.01); *H04W 12/06* (2013.01); *H04W 16/18* (2013.01); *H04W 24/02* (2013.01); *H04W 24/10* (2013.01); *H04W 28/0221* (2013.01); *H04W 28/0236* (2013.01); *H04W 28/04* (2013.01); *H04W 36/0072* (2013.01); *H04W 40/02* (2013.01); *H04W 40/34* (2013.01); *H04W 52/00* (2013.01); *H04W 52/0209* (2013.01); *H04W 52/0212* (2013.01); *H04W 52/0216* (2013.01); *H04W 52/0229* (2013.01); *H04W 64/003* (2013.01); *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 72/0446* (2013.01); *H04W 74/0816* (2013.01); *H04W 76/02* (2013.01); *H04W 76/021* (2013.01); *H04W 76/023* (2013.01); *H04W 76/025* (2013.01); *H04W 76/026* (2013.01); *H04W 76/048* (2013.01); *H04W 88/06* (2013.01); *H04W 16/28* (2013.01); *H04W 36/14* (2013.01); *H04W 52/0258* (2013.01); *H04W 88/12* (2013.01); *H04W 92/18* (2013.01); *Y02B 60/50* (2013.01)

(58) Field of Classification Search
USPC .......................................... 370/229, 329, 338
See application file for complete search history.

(56) References Cited

U.S. PATENT DOCUMENTS

| | | |
|---|---|---|
| 6,625,227 B1 | 9/2003 | Shull et al. |
| 7,474,686 B2 | 1/2009 | Ho |
| 7,734,752 B2 | 6/2010 | Zuk et al. |
| 7,924,742 B2 | 4/2011 | Hanes |
| 8,155,102 B1 | 4/2012 | Hakola et al. |
| 8,213,360 B2 | 7/2012 | Koskela et al. |
| 8,359,038 B2 | 1/2013 | Hakola et al. |
| 8,447,315 B2 | 5/2013 | Hakola et al. |
| 8,520,575 B2 | 8/2013 | Doppler et al. |
| 8,554,200 B2 | 10/2013 | Ribeiro et al. |
| 8,577,363 B2 | 11/2013 | Wijting et al. |
| 8,588,690 B2 | 11/2013 | Turtinen et al. |
| 8,588,803 B2 | 11/2013 | Hakola et al. |
| 8,666,403 B2 | 3/2014 | Yu et al. |
| 8,755,316 B2 | 6/2014 | Aschan et al. |
| 8,761,099 B2 | 6/2014 | Charbit et al. |
| 8,775,944 B2 | 7/2014 | Hayton |
| 8,909,265 B2 | 12/2014 | Xu et al. |
| 8,913,518 B2 | 12/2014 | Heo et al. |
| 8,989,729 B2 | 3/2015 | Barclay et al. |
| 9,036,603 B2 | 5/2015 | Johnsson et al. |
| 9,125,076 B2 | 9/2015 | Lehane |
| 9,301,083 B2 | 3/2016 | Jain |
| 9,363,702 B2 | 6/2016 | He et al. |
| 9,554,296 B2 | 1/2017 | Rao et al. |
| 2002/0045428 A1 | 4/2002 | Chesson |
| 2004/0170217 A1 | 9/2004 | Ho |
| 2004/0233858 A1* | 11/2004 | Karaoguz ................. H04L 1/20 370/254 |
| 2004/0258040 A1 | 12/2004 | Joshi et al. |
| 2005/0043045 A1 | 2/2005 | Cheng et al. |
| 2005/0190772 A1 | 9/2005 | Tsai et al. |
| 2007/0129076 A1 | 6/2007 | Cho et al. |
| 2007/0153747 A1* | 7/2007 | Pan ...................... H04W 36/14 370/338 |
| 2008/0045178 A1 | 2/2008 | Venkatachalam |
| 2008/0052769 A1 | 2/2008 | Leone et al. |
| 2008/0186895 A1 | 8/2008 | Shang et al. |
| 2008/0318607 A1 | 12/2008 | Torsner et al. |
| 2009/0016232 A1 | 1/2009 | Kwon et al. |
| 2009/0207817 A1 | 8/2009 | Montemurro et al. |
| 2010/0009675 A1 | 1/2010 | Wijting et al. |
| 2010/0009690 A1 | 1/2010 | Jin et al. |
| 2010/0026802 A1 | 2/2010 | Titus et al. |
| 2010/0110897 A1 | 5/2010 | Chun et al. |
| 2010/0238984 A1 | 9/2010 | Sayana et al. |
| 2010/0317345 A1 | 12/2010 | Futaki et al. |

(56) References Cited

U.S. PATENT DOCUMENTS

| | | | |
|---|---|---|---|
| 2011/0098043 A1* | 4/2011 | Yu | H04W 60/00 455/435.1 |
| 2011/0134774 A1 | 6/2011 | Pelletier et al. | |
| 2011/0170420 A1 | 7/2011 | Xi et al. | |
| 2011/0250892 A1 | 10/2011 | Gupta et al. | |
| 2011/0256894 A1 | 10/2011 | Khandelia et al. | |
| 2011/0258313 A1 | 10/2011 | Mallik et al. | |
| 2011/0258327 A1* | 10/2011 | Phan | H04W 16/10 709/227 |
| 2011/0268006 A1 | 11/2011 | Koskela et al. | |
| 2011/0280155 A1 | 11/2011 | Shi | |
| 2011/0306349 A1 | 12/2011 | Hakola et al. | |
| 2011/0317559 A1 | 12/2011 | Kern et al. | |
| 2011/0317571 A1 | 12/2011 | Kokkinen et al. | |
| 2012/0011247 A1* | 1/2012 | Mallik | H04W 8/005 709/224 |
| 2012/0030358 A1 | 2/2012 | Mackenzie | |
| 2012/0039273 A1 | 2/2012 | Nam et al. | |
| 2012/0057476 A1 | 3/2012 | Chan et al. | |
| 2012/0106517 A1 | 5/2012 | Charbit et al. | |
| 2012/0155355 A1 | 6/2012 | Kwon et al. | |
| 2012/0157121 A1 | 6/2012 | Li et al. | |
| 2012/0176950 A1 | 7/2012 | Zhang et al. | |
| 2012/0182962 A1 | 7/2012 | Patil et al. | |
| 2012/0190331 A1 | 7/2012 | Ahmed et al. | |
| 2012/0198233 A1 | 8/2012 | George et al. | |
| 2012/0202508 A1 | 8/2012 | Toth et al. | |
| 2012/0213183 A1 | 8/2012 | Chen et al. | |
| 2012/0252481 A1 | 10/2012 | Anpat et al. | |
| 2012/0309447 A1 | 12/2012 | Mustajarvi et al. | |
| 2013/0021968 A1 | 1/2013 | Reznik et al. | |
| 2013/0064138 A1 | 3/2013 | Hakola et al. | |
| 2013/0083653 A1 | 4/2013 | Jain et al. | |
| 2013/0115983 A1 | 5/2013 | Rönneke et al. | |
| 2013/0115993 A1 | 5/2013 | Jain et al. | |
| 2013/0155948 A1 | 6/2013 | Pinheiro et al. | |
| 2013/0155954 A1 | 6/2013 | Wang et al. | |
| 2013/0160101 A1 | 6/2013 | Hakola et al. | |
| 2013/0170351 A1 | 7/2013 | Reznik et al. | |
| 2013/0182607 A1 | 7/2013 | Kim et al. | |
| 2013/0223352 A1 | 8/2013 | Sartori et al. | |
| 2013/0223356 A1 | 8/2013 | Khoshnevis et al. | |
| 2013/0250910 A1 | 9/2013 | Liao et al. | |
| 2013/0273855 A1 | 10/2013 | Cherian et al. | |
| 2013/0279372 A1 | 10/2013 | Jain et al. | |
| 2013/0288732 A1 | 10/2013 | Beale | |
| 2014/0004796 A1* | 1/2014 | Cakulev | H04W 76/023 455/41.2 |
| 2014/0004867 A1 | 1/2014 | Noh et al. | |
| 2014/0011505 A1 | 1/2014 | Liao | |
| 2014/0022898 A1 | 1/2014 | Kim et al. | |
| 2014/0029530 A1 | 1/2014 | Kim et al. | |
| 2014/0036774 A1 | 2/2014 | Lehane et al. | |
| 2014/0036793 A1 | 2/2014 | Johnsson et al. | |
| 2014/0036795 A1 | 2/2014 | Tarradell et al. | |
| 2014/0036876 A1 | 2/2014 | Li et al. | |
| 2014/0038549 A1 | 2/2014 | Lehane et al. | |
| 2014/0040504 A1 | 2/2014 | Gupta | |
| 2014/0050160 A1 | 2/2014 | Ronneke et al. | |
| 2014/0086144 A1 | 3/2014 | Foti et al. | |
| 2014/0092808 A1 | 4/2014 | Jain et al. | |
| 2014/0112251 A1 | 4/2014 | Kim et al. | |
| 2014/0113609 A1 | 4/2014 | Elloumi et al. | |
| 2014/0120907 A1* | 5/2014 | Yu | H04W 76/023 455/426.1 |
| 2014/0134996 A1 | 5/2014 | Barclay et al. | |
| 2014/0171091 A1 | 6/2014 | Cai et al. | |
| 2014/0177583 A1 | 6/2014 | Aso et al. | |
| 2014/0185467 A1 | 7/2014 | Heo et al. | |
| 2014/0269779 A1 | 9/2014 | Shan et al. | |
| 2014/0286162 A1 | 9/2014 | Kim et al. | |
| 2014/0307632 A1 | 10/2014 | Kim et al. | |
| 2015/0023164 A1 | 1/2015 | Starsinic et al. | |
| 2015/0049732 A1 | 2/2015 | Xue et al. | |
| 2015/0139197 A1 | 5/2015 | He et al. | |
| 2015/0172909 A1 | 6/2015 | Chandramouli et al. | |
| 2015/0181564 A1 | 6/2015 | Rao et al. | |
| 2015/0208450 A1 | 7/2015 | Mademann et al. | |
| 2015/0271623 A1 | 9/2015 | Kim et al. | |
| 2016/0007390 A1 | 1/2016 | Starsinic et al. | |

FOREIGN PATENT DOCUMENTS

| | | |
|---|---|---|
| CN | 102264036 A | 11/2011 |
| CN | 102334370 A | 1/2012 |
| CN | 102427604 A | 4/2012 |
| CN | 103582006 A | 2/2014 |
| CN | 103582066 A | 2/2014 |
| CN | 104412524 A | 3/2015 |
| CN | 104429141 A | 3/2015 |
| CN | 104429147 A | 3/2015 |
| CN | 104471876 A | 3/2015 |
| CN | 105848088 A | 8/2016 |
| EP | 2421306 A1 | 2/2012 |
| EP | 2880782 A | 6/2015 |
| EP | 2880955 A | 6/2015 |
| EP | 2880956 A2 | 6/2015 |
| ES | 2473415 A2 | 7/2014 |
| FR | 2994361 A1 | 2/2014 |
| HK | 1207751 A1 | 2/2016 |
| JP | 2006523404 A | 10/2006 |
| JP | 2007295541 A | 11/2007 |
| JP | 2008527884 A | 7/2008 |
| JP | 2009141756 A | 6/2009 |
| JP | 2009527940 A | 7/2009 |
| JP | 2009272951 A | 11/2009 |
| JP | 2010199871 A | 9/2010 |
| JP | 2011530216 A | 12/2011 |
| JP | 2015527000 A | 9/2015 |
| JP | 5928860 B2 | 6/2016 |
| JP | 2016129351 A | 7/2016 |
| KR | 1020110052426 A | 5/2011 |
| KR | 1020110086758 A | 7/2011 |
| KR | 1020110093642 A | 8/2011 |
| KR | 1020120031546 A | 4/2012 |
| KR | 1020120061881 A | 6/2012 |
| KR | 1020120070444 A | 6/2012 |
| KR | 1020120071676 A | 7/2012 |
| KR | 1020120074225 A | 7/2012 |
| KR | 1020120074251 A | 7/2012 |
| KR | 101618534 B1 | 4/2016 |
| TW | 201410054 A | 3/2014 |
| TW | 201419898 A | 5/2014 |
| WO | WO-0163946 A1 | 8/2001 |
| WO | WO-2010028690 A1 | 3/2010 |
| WO | WO-2010080966 A1 | 7/2010 |
| WO | WO-2010130870 A1 | 11/2010 |
| WO | WO-2011088406 A1 | 7/2011 |
| WO | WO-2011119680 A2 | 9/2011 |
| WO | WO-2011130623 A2 | 10/2011 |
| WO | WO-2011131666 A1 | 10/2011 |
| WO | WO-2011139043 A2 | 11/2011 |
| WO | WO-2011153269 A1 | 12/2011 |
| WO | WO-2011160682 A1 | 12/2011 |
| WO | WO-2012016378 A1 | 2/2012 |
| WO | WO-2012056209 A1 | 5/2012 |
| WO | WO-2012061770 A2 | 5/2012 |
| WO | WO-2012066189 A1 | 5/2012 |
| WO | WO-2012068731 A1 | 5/2012 |
| WO | WO-2012077977 A2 | 6/2012 |
| WO | WO-2012087009 A2 | 6/2012 |
| WO | WO-2012091420 A2 | 7/2012 |
| WO | WO-2013185841 A1 | 12/2013 |
| WO | WO-2014021984 A1 | 2/2014 |
| WO | WO-2014021987 A1 | 2/2014 |
| WO | WO-2014021989 A1 | 2/2014 |
| WO | WO-2014021990 A1 | 2/2014 |
| WO | WO-2014021998 A2 | 2/2014 |
| WO | WO-2014021998 A3 | 2/2014 |
| WO | WO-2014022769 A1 | 2/2014 |
| WO | WO-2014022776 A1 | 2/2014 |
| WO | WO-2014022797 A1 | 2/2014 |

(56) References Cited

FOREIGN PATENT DOCUMENTS

OTHER PUBLICATIONS

"3rd Generation Partnership Project; Technical Specification Group Core Network and Terminals; Tsp interface protocol between the MTC Interworking Function (MTC-IWF) and Service Capability Server (SCS) (Release 11)", 3GPP Standard; 3GPP TS 29.368, 3RD Generation GPP Standard; 3GPP TS 29.368, 3RD Generation; 650, Route Des Lucioles; F-06921 Sophia-Antipolis Cedex; France, vol. CT WG1, No. V1.0.0,, (Jun. 6, 2012), 1-17.
"3rd Generation Partnership Project; Technical Specification Group Services and System Aspects; Architecture enhancements to facilitate Communications with packet data networks and applications (Release 11)", 3gpp Draft; 23682-010-Cl, 3rd Generationpartnership Project (3GPP), Mobile Competence Centre; 650, Route Des Lucioles ; F-06921 Sophia-Antipolis Cedex ; France, (Jul. 6, 2012), 27 pgs.
"U.S. Appl. No. 14/124,984, Non Final Office Action dated May 5, 2016", 20 pgs.
"U.S. Appl. No. 14/126,983, Examiner Interview Summary dated Jan. 15, 2016", 3 pgs.
"U.S. Appl. No. 14/126,983, Final Office Action dated Nov. 19, 2015", 9 pgs.
"U.S. Appl. No. 14/126,983, Notice of Allowance dated Feb. 4, 2016", 5 pgs.
"U.S. Appl. No. 14/126,983, Response filed Jan. 19, 2016 to Final Office Action dated Nov. 19, 2015", 7 pgs.
"U.S. Appl. No. 14/126,983, Supplemental Notice of Allowability dated Feb. 19, 2016", 2 pgs.
"U.S. Appl. No. 14/126,983, Supplemental Notice of Allowability dated Mar. 31, 2016", 2 pgs.
"U.S. Appl. No. 14/126,983, Supplemental Notice of Allowability dated Apr. 12, 2016", 2 pgs.
"European Application Serial No. 13825698.7, Extended European Search Report dated Mar. 15, 2016", 9 pgs.
"Eurpoean Application Serial No. 13826192.0, Partial Supplementary European Search Report dated Feb. 8, 2016", 7 pgs.
"Japanese Application Serial No. 2015-524265, Office Action dated Dec. 22, 2015", W/ English Translations, 5 pgs.
"Japanese Application Serial No. 2015-524265, Response filed Feb. 1, 2016 to Office Action dated Dec. 22, 2015", W/ English Claims, 22 pgs.
"Korean Application Serial No. 10-2015-7000080, Response filed Feb. 24, 2016 to Office Action dated Sep. 24, 2015", W/ English Translation, 34 pgs.
"Korean Application Serial No. 10-2016-7004953, Notice of Preliminary Rejection dated Apr. 7, 2016", W/ English Translation, 12 pgs.
"Use case: Enabling ProSe via LTE+WLAN", 3GPP TSG-SA WG1 Meeting #58: S1-121089, (May 2012), 4 pgs.
"U.S. Appl. No. 14/124,984, Response filed Aug. 3, 2016 to Non Final Office Action dated May 5, 2016", 13 pgs.
"Design Aspects of Network Assisted Device-to-Device Communications", [Online]. Retrieved from the Internet: URL: h ttp ://www.eri csson. com/res/docs/2012/design-aspects-of-network-assi sted-deviceto-device-communications.pdf, (May 1, 2011), 2-9.
"European Application Serial No. 13826192.0, Extended European Search Report dated Jun. 22, 2016", 9 pgs.
"European Application Serial No. 13826478.3, Extended European Search Report dated Jun. 1, 2016", 10 pgs.
"European Application Serial No. 16164831.6, Extended European Search Report dated Jul. 4, 2016", 10 pgs.
"Korean Application Serial No. 10-2016-7004953, Response filed Jun. 7, 2016 to Notice of Preliminary Rejection dated Apr. 7, 2016", W/ English Translation of Claims, 28 pgs.
"ProSe Use Case for Unidirectional D2D Communication", 3gpp Draft; SI-120065 Fs Prose Operatior Managed Unidirectional D2d, 3rd Generation Partnership Project (3GPP), Mobile Competence Centre ; 650. Route Deslucioles ; F-06921 Sophia-Antipolis Cedex; France, vol. SA WG1, no. Kyoto, Japan, (Feb. 6, 2012), 3 pgs.
"U.S. Appl. No. 14/124,984, Notice of Allowance dated Sep. 12, 2016", 11 pgs.
"European Application Serial No. 13825698.7, Response filed Oct. 14, 2016 to Extended European Search Report dated Mar. 15, 2016 ", 23 pgs.
"Korean Application Serial No. 10-2016-7004953, Office Action dated Oct. 26, 2016", W/ English Translation, 5 pgs.
"Korean Application Serial No. 10-2016-7004953, Final Office Action dated Sep. 8, 2016"W/ English Translation, 7 pgs.
"Korean Application Serial No. 10-2016-7004953, Response filed Oct. 10, 2016 to Final Office Action dated Sep. 8, 2016", W/ English Claims, 17 pgs.
U.S. Appl. No. 14/124,984, filed Dec. 9, 2013, Device Trigger Recall/Replace Feature for 3GPP/M2M Systems.
U.S. Appl. No. 14/126,983, filed Dec. 17, 2013, Method and System for Enabling Device-To-Device Communication.
"3rd Generation Partnership Project; Technical Specification Group Core Network and Terminals; Access Network Discovery and Selection Function (ANDSF) Management Object (MO)(Release 11)", 3GPP TS 24.312 V11.3.0, (2012).
"3rd Generation Partnership Project; Technical Specification Group Core Network and Terminals; Access Network Discovery and Selection Function (ANDSF) Management Object (MO)(Release 11)", ETSI TS 24.312 Version 11.6.0, (Mar. 15, 2013).
"Generation Partnership Project; Technical Specification Group Core Network and Terminals; Access Network Discovery and Selection Function (ANDSF) Management Object (MO)(Release 11)", ETSI TS 24.312 Version 11.3.0, (Jun. 27, 2012).
"3rd Generation Partnership Project; Technical Specification Group Services and System Aspects; Data Identification in Access Network Discovery and Selection Function (ANDSF)(DIDA)(Release 11)", 3GPP TR 23.855 V11.0.0, (2012).
"Access Network Discovery and Selection Function (ANDSF) Management Object", Universal Mobile Telecommunications System (UMTS); LTE;,(Jul. 2012), 72-155.
"Access Network Discovery and Selection Function (ANDSF) Management Object MO", 3GPP TS 24.312 V11.4.0. Technical Specification Group Core Network and Terminals. Release 11., (Sep. 2012), 168 pgs.
"U.S. Appl. No. 13/687,838, Final Office Action dated Apr. 10, 2015", 36 pgs.
"U.S. Appl. No. 13/687,838, Non Final Office Action dated Nov. 26, 2014", 31 pgs.
"U.S. Appl. No. 13/687,838, Response filed Feb. 26, 2015 to Non Final Office Action dated Nov. 26, 2014", 13 pgs.
"U.S. Appl. No. 13/711,338, Applicant Interview Summary dated Aug. 25, 2014", 2 pgs.
"U.S. Appl. No. 13/711,338, Examiner Interview Summary dated Aug. 21, 2014", 2 pgs.
"U.S. Appl. No. 13/711,338, Non Final Office Action dated Feb. 4, 2015", 16 pgs.
"U.S. Appl. No. 13/711,338, Preliminary Amendment filed Mar. 15, 2013", 6 pgs.
"U.S. Appl. No. 13/718,745, Non Final Office Action dated Aug. 7, 2014", 19 pgs.
"U.S. Appl. No. 13/718,745, Notice of Allowance dated Jan. 21, 2015", 12 pgs.
"U.S. Appl. No. 13/718,745, Response filed Sep. 30, 2014 to Non Final Office Action dated Aug. 7, 2014", 16 pgs.
"U.S. Appl. No. 13/729,117, Notice of Allowance dated Aug. 12, 2014", 14 pgs.
"U.S. Appl. No. 13/790,630, Final Office Action dated Feb. 3, 2015", 16 pgs.
"U.S. Appl. No. 13/790,630, Non Final Office Action dated Sep. 5, 2014", 17 pgs.
"U.S. Appl. No. 13/790,630, Notice of Allowance dated Mar. 31, 2015", 7 pgs.
"U.S. Appl. No. 13/790,630, Response filed Jan. 5, 2015 to Non Final Office Action dated Sep. 5, 2014", 9 pgs.
"U.S. Appl. No. 13/790,630, Response filed Mar. 17, 2015 to Final Office Action dated Feb. 3, 2015", 10 pgs.

(56) References Cited

OTHER PUBLICATIONS

"U.S. Appl. No. 14/124,984, Preliminary Amendment filed Dec. 9, 2013", 11 pgs.
"U.S. Appl. No. 14/125,973, Preliminary Amendment filed Dec. 13, 2013", 3 pgs.
"U.S. Appl. No. 14/126,983, Non Final Office Action dated Jun. 3, 2015", 10 pgs.
"U.S. Appl. No. 14/126,983, Preliminary Amendment filed Dec. 17, 2013", 8 pgs.
"U.S. Appl. No. 14/570,555, Preliminary Amendment filed Mar. 2, 2015", 9 pgs.
"Application-ID", Qualcomm Incorporated, C1-122886, Change Request 24.312 CR 0098 rev—Curren Version: 11.3.0 3GPP TSG-CT WG 1 Meeting #79, (2012), 1-14.
"Change Request", 3GPP TSG-CT WG1 Meeting #79, C1-122989., (Aug. 6, 2012), 14 pgs.
"Change Request", 3GPP TSG-CT WG1 Meeting #79. C1-123455. Revision of C1-123435, C1-123079, C1-122886., (Aug. 6, 2012), 97 pgs.
"Change Request", 3GPP TSG-CT WG1 Meeting #803 C1-123965., (Oct. 2012), 15 pgs.
"Discussion on OS type leaf", Qualcomm Incorporated, C1-122076, 3GPP TSG CT WG1 Meeting #78, (May 2012).
"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.
"Evolved Universal Terrestrial Radio Access (E-UTRA); Radio Resource Control (RRC); Protocol specification", 3GPP TS 36.331 V11.5.0. Technival Specification Group Radio Access Network. Release 11., (Sep. 2013), 347 pgs.
"Finland Application Serial No. 20135806, Office Action dated Aug. 15, 2014", 7 pgs.
"International Application Serial No. PCT/US2013/044139, International Preliminary Report on Patentability dated Feb. 12, 2015", 7 pgs.
"Intenational Application Serial No. PCT/US2013/044139, International Search Report dated Sep. 16, 2013", 3 pgs.
"International Application Serial No. PCT/US2013/044139, Written Opinion dated Sep. 16, 2013", 5 pgs.
"International Application No. PCT/US2013/044384, International Search Report dated Nov. 15, 2013", 3 pgs.
"International Application Serial No. PCT/US2013/044384, Written Opinion dated Nov. 15, 2013", 5 pgs.
"International Application Serial No. PCT/US2013/044445, International Preliminary Report on Patentability dated Feb. 12, 2015", 11 pgs.
"International Application Serial No. PCT/US213/044445, International Search Report dated Sep. 16, 2013", 3 pgs.
"International Application Serial No. PCT/US2013/044445, Written Opinion dated Sep. 16, 2013", 9 pgs.
"International Application Serial No. PCT/US2013/044530, International Preliminary Report on Patentability dated Feb. 12, 2015", 9 pgs.
"International Application Serial No. PCT/US2013/044530, International Search Report dated Sep. 4, 2013", 3 pgs.
"International Application Serial No. PCT/US2013/044530, Written Opinion dated Sep. 4, 2013", 7 pgs.
"International Application Serial No. PCT/US2013/044543, International Preliminary Report on Patentability dated Feb. 12, 2015", 10 pgs.
"International Application Serial No. PCT/US2013/044543, International Search Report dated Aug. 27, 2013", 4 pgs.
"International Application Serial No. PCT/US2013/044543, Written Opinion dated Aug. 27, 2013", 8 pgs.
"International Application Serial No. PCT/US2013/045656, International Preliminary Report on Patentability dated Feb. 12, 2015", 12 pgs.
"International Application Serial No. PCT/US2013/045656, International Search Report dated Apr. 15, 2014", 3 pgs.
"International Application Serial No. PCT/US2013/045656, Written Opinion dated Apr. 15, 2014", 10 pgs.
"International Application Serial No. PCT/US2013/053420, International Preliminary Report on Patentability dated Feb. 12, 2015", 6 pgs.
"International Application Serial No. PCT/US2013/053420, International Search Report dated Dec. 2, 2013", 3 pgs.
"International Application Serial No. PCT/US2013/053420, Written Opinion dated Dec. 2, 2013", 4 pgs.
"International Application Serial No. PCT/US2013/053428, International Preliminary Report on Patentability dated Feb. 12, 2015", 10 pgs.
"International Application Serial No. PCT/US2013/053428, International Search Report dated Dec. 19, 2013", 4 pgs.
"International Application Serial No. PCT/US2013/053428, Written Opinion dated Dec. 19, 2013", 8 pgs.
"International Application Serial No. PCT/US2013/053470, International Preliminary Report on Patentability dated Feb. 12, 2015", 6 pgs.
"International Application Serial No. PCT/US2013/053470, International Search Report dated Nov. 21, 2013", 3 pgs.
"International Application Serial No. PCT/US2013/053470, Written Opinion dated Nov. 21, 2013", 4 pgs.
"Netherlands Application Serial No. 2011257, Search Report and Written Opinion dated Mar. 18, 2014", 11 pgs.
"Netherlands Application Serial No. 2011259, Search Report dated Jun. 13, 2014", 2 pgs.
"Netherlands Application Serial No. 2011259, Written Opinion dated Jun. 13, 2014", 8 pgs.
"Non-Access Stratum (NAS) configuration Management Object (MO)"3GPP TS 24.368 V11.2.0. Technical Specification Group Core Network and Terminals. Release 11., (Sep. 2012), 13 pgs.
"Spanish Application Serial No. 201331212, Search Report dated Oct. 27, 2014", W/ English References, 4 pgs.
"Spanish Application Serial No. 201331212, Written Opinion dated Oct. 27, 2014", W/ English Translation, 10 pgs.
"Spanish Application Serial No. P201331208, Office Action dated Sep. 22, 2014", in Spanish, 5 pgs.
"Spanish Application Serial No. P201331208, Written Opinion dated Sep. 22, 2014", W/ English Translation, 4 pgs.
"Sweden Application Serial No. 1350931-0, Office Action dated Dec. 29, 2014", w/ English Claims, 16 pgs.
"Sweden Application Serial No. 1350932-8, Office Action dated Jan. 21, 2015", W/ English Translation, 5 pgs.
"T5 based downlink small data transfer without establishing RRC security", CATT; 3GPP Draft: S2-122826 T5 Based Downlink Small Data Transfer Without Establishing RRC Security, 3rd Generation Partnership Project (3GPP), Mobile Competence Centre; 650, Route Des Lucioles: F-06921 Sophia-Antipolis Cedex; France deel SA Wg2, nr. Barcelona, Spain,, (Jul. 2012), 3 pgs.
"Taiwanese Application Serial No. 102127609, Office Action dated Dec. 1, 2014", w/ English Translation, 15 pgs.
"Taiwanese Application Serial No. 102127618, Office Action dated Dec. 1, 2014", W/ English Translation, 20 pgs.
"Technical Specification Group Radio Access Network; Evolved Universal Terrestrial Radi Access (E-UTRA); Radio Resource Control (RRC); Protocol specification", 3GPP TS 36.331 V11.2.0 (Release 11), (Dec. 2012), 340 pgs.
"Technical Specification Group Radio Access Network; Evolved Universal Terrestrial Radio Access Network (E-UTRAN); S1 Application Protocol (S1AP)", 3GPP TS 36.413 V11.2.1 (Release 11), (Feb. 2013), 272 pgs.
"Tranfer and update of solution of small data transfer in NAS signalling", Vodafone, [RIM?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.
"Use of generic NAS Transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.

(56) References Cited

OTHER PUBLICATIONS

Abraham, Santosh, et al., "Efficient Device and Service Discovery for Peer-to-Peer (P2P) scenarios", IEEE 802.11-11/1517r0, (Oct. 25, 2011).
Doppler, Klaus, et al., "Device-to-Device Communication as an Underlay to LTE-Advanced Networks", IEEE Communications Magazine, 47(12), (Dec. 2009), 42-49.
Ericson, Juniper, et al., "Device triggering procedure", 3GPP TSG-CT WG3 Meeting #69. C3-120956., [Online] Retrieved from the internet:<http://v9ww.3gpp.org/ftp/tsg_ct/WG3_interworking_ex-CN3/TSGC3_69JKyoto/Docs/>, (May 21, 2012), 4 pgs.
Ericsson, et al., "Control Signaling in Support of CoMP", 3GPP TSG-RAN WG1 #69. R1-122843., (May 21, 2012), 3 pgs.
Fodor, Gabor, et al., "Design Aspects of Network Assisted Device-to-Device Communications", IEEE Communications Magazine, vol. 50, Issue 3, (Mar. 2012), 170-177.
Levy, Joseph, et al., "WLAN and Cellular Interworking and Discover Use Case", IEEE 11-12/0346r0, (Mar. 9, 2012), 11 pgs.
Mobility, Motorola, et al., "Conclusions for Traffic Identification based on Application", (Nov. 2011).
Pekka, Janis, et al., "Interference-aware resource allocations for device-to-device radio underlaying cellular networks", IEEE, (2009), 5 pgs.
Zulhasnine, Mohammad, et al., "Efficient Resource Allocation for Device-to-Device Communication Underlaying LTE Network", IEEE 6th International Conference on Wireless and Mobile Computing, Networking and Communications, (2010), 368-375.
"Korean Application Serial No. 10-2015-7000080, Office Action dated Sep. 24, 2015", W/ English Translation, 20 pgs.
"Chinese Application Serial No. 201380035966.2, Office Action dated Jan. 22, 2017", w/English Translation, 7 pgs.
"European Application Serial No. 13826192.0, Response filed Jan. 18, 2017 to Extended European Search Report dated Jun. 22, 2016", 9 pgs.
"European Application Serial No. 13826478.3, Response filed Dec. 22, 2016 to Extended European Search Report dated Jun. 1, 2016", 20 pgs.
"European Application Serial No. 16164831.6, Response filed Feb. 22, 2017 to Extended European Search Report dated Jul. 4, 2016", 10 pgs.
"Japanese Application Serial No. 2016-017086, Office Action dated Apr. 11, 2017", w/ Englsih Claims, 2 pgs.
"Japanese Application Serial No. 2016-017086, Office Action dated Dec. 20, 2016", w/English Translation, 8 pgs.
"Japanese Applications Serial No. 2016-017086, Response filed Mar. 17, 2017 to Office Action dated Dec. 20, 2016", w/ English Claims, 5 pgs.
"Korean Application Serial No. 10-2016-7004953, Response filed Dec. 26, 2016 to Office Action dated Oct. 26, 2016", w/English Translation, 8 pgs.
"SA WG2 meeting #86 S2-113680", solution of suppressing device trigger, 3GPP., (Jul. 15, 2011).
"Chinese Application Serial No. 201380035348.8, Office Action dated Jul. 19, 2017", W/ English Translation, 16 pgs.
"Chinese Application U.S. Appl. No. 201380035394.8, Office Action dated Jun. 27, 2017", w/ English Translation, 24 pgs.
"Chinese Application Serial No. 201380035966.2, Response filed Jun. 6, 2017 to Office Action dated Jan. 22, 2017", w/ English Claims, 80 pgs.
"U.S. Appl. No. 13/718,745, Examiner Interview Summary dated Sep. 16, 2014", 3 pgs.
"U.S. Appl. No. 14/126,983, Response filed Sep. 3, 2015 to Non Final Office Action dated Jun. 3, 2015", 9 pgs.
Mustapha, Mona, et al., "Draft 2 of 3GPP TSG-SA WG1 Meeting #58: S1-122004", (Jul. 2012), 74 pgs.

* cited by examiner

NETWORK ASSISTANCE FOR DEVICE-TO-DEVICE DISCOVERY

PRIORITY APPLICATION

This application is a continuation of U.S. application Ser. No. 13/718,745, filed Dec. 18, 2012, now issued as U.S. Pat. No. 9,036,603, which claims priority to U.S. Provisional Patent Application Ser. No. 61/679,627, filed on Aug. 3, 2012, all of which are hereby incorporated by reference in their entirety.

TECHNICAL FIELD

Embodiments pertain to operations and communications performed by communicating devices in wireless networks. Some embodiments relate to device-to-device (D2D) communications and authentication techniques between devices facilitated by a wireless network.

BACKGROUND

D2D wireless communication techniques may be used to perform peer-to-peer/point-to-point (P2P) communications among mobile devices and networks in a variety of settings. D2D communications between mobile devices may be designed to complement the use of centralized communications from a wireless base station, for example, centralized station-to-mobile communications from an evolved NodeB (eNodeB) in a carrier network operating with a standard from a 3GPP Long Term Evolution/Long Term Evolution-Advanced (LTE/LTE-A) standards family, or from an access point (AP) in a Wi-Fi network operating with a standard from a IEEE 802.11 standards family.

D2D direct communications are limited to devices located within the communication range of the wireless protocol or network configuration being used. However, a particular user may not be aware whether D2D communication-capable devices or known users associated with D2D communication-capable devices are within communication range, or whether such devices or users are currently or are prospectively in proximity to the particular user. Existing discovery techniques used to locate and seek out nearby D2D-capable devices generally involve the use of broadcasting and response schemes, which utilize detailed processing, responses, and data exchanges to discover devices.

DETAILED DESCRIPTION

Figure 1:
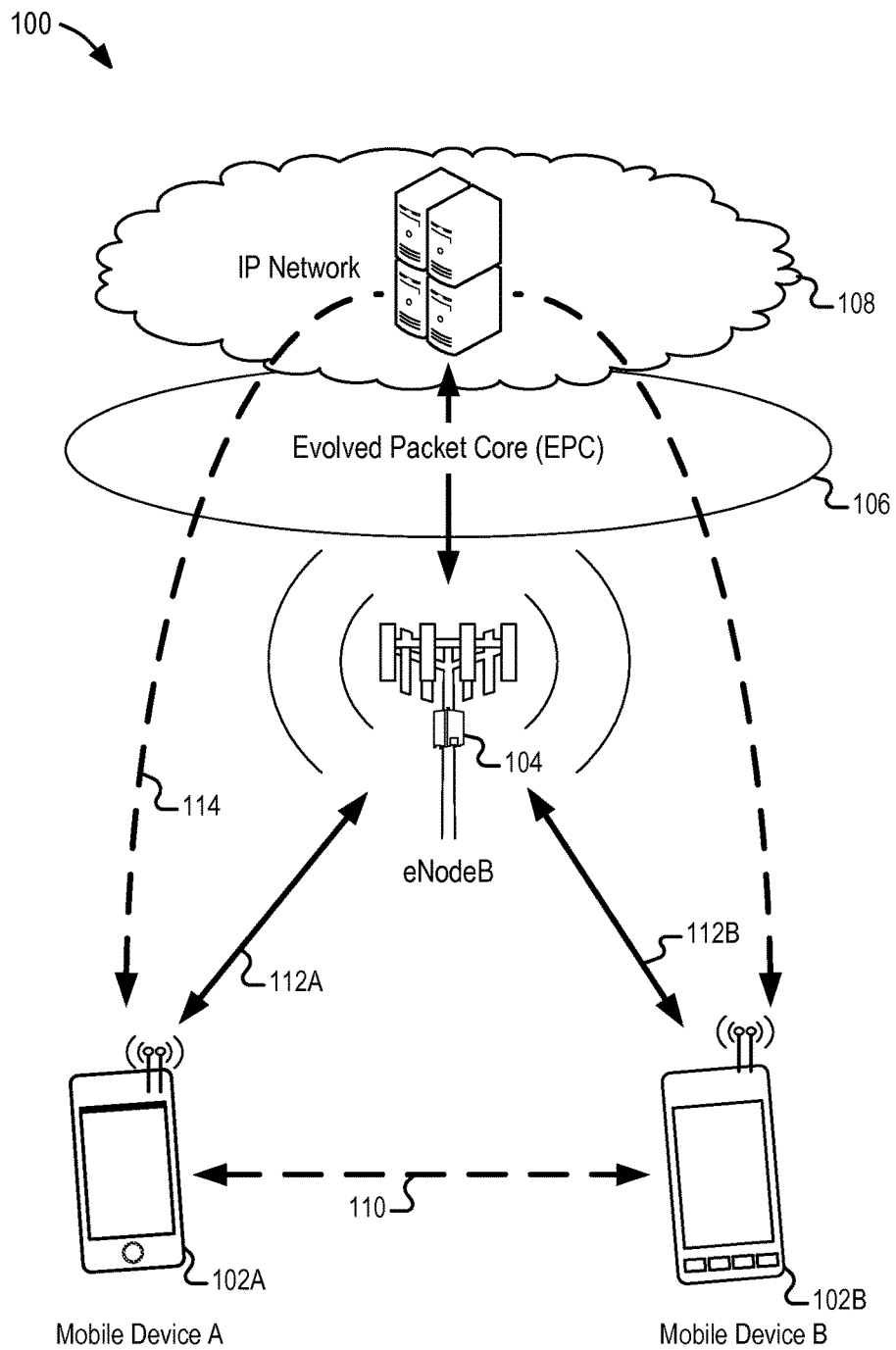
FIG. 1 illustrates a network configuration for facilitating D2D communications through an operator-managed network according to a further described example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for network awareness and discovery techniques for establishing D2D communication links among mobile devices. These discovery techniques may be used to facilitate location of various D2D-capable devices within a network, and authentication between devices. Upon discovery and authentication of the proximate D2D devices, a D2D communication link between the proximate D2D devices may be established to facilitate the exchange of data over a wireless D2D communication link. The D2D communication link may be deployed in connection with various location- or proximity-based services, and in connection with service management and resource offloading. The D2D communication link may occur over a different wireless network (e.g., a Wi-Fi network), or may be a variant of LTE-based direct-device communication.

In some examples, a user equipment (UE) in communication with a carrier network (e.g., a cellular radio access network (RAN)) may request UE discovery assistance from the evolved packet core (EPC) of the carrier network. Information obtained from the assistance may include information to assist the D2D connection discovery process, along with discovery details of other UEs in proximity to the discovering UE. The EPC may also communicate authentication, security, and identification information, and establish a time period to coordinate D2D discovery and connection operations.

In existing techniques used to establish D2D connections, devices manually (and often continually) scan or broadcast connection availability via the wireless medium in order to locate nearby D2D-capable devices. Such techniques often involve constant scanning and associated power usage. Further, even upon discovery of a nearby D2D-capable device, identification and authentication issues may prevent establishment of a D2D connection. The techniques described herein enable a common discovery and identification mechanism through data communicated from the carrier network to connecting UEs to facilitate the D2D connection establishment process.

In an LTE/LTE-A network environment, an EPC is aware which UEs are associated with a public land mobile network (PLMN) and a particular eNodeB, or which UEs are operating in an idle mode. Likewise, the EPC is also aware of tracking areas for UEs, and whether a UE is in communication with a tracking area involving a plurality of different eNodeBs. The EPC may also maintain a location service to maintain an approximate location of the various UEs. Using the techniques described herein, this tracking and location information of the UEs can be applied for use with assisting the discovery of D2D-capable devices and the establishment of a D2D connection for direct communications. Further, the techniques described herein may be deployed across the coverage area of the LTE/LTE-A network managed by the EPC, extending discovery operations and establishment of D2D connections beyond a single wireless local area network (WLAN) access point.

FIG. 1 provides an illustration of an example network configuration 100 for facilitating direct D2D communications through a carrier-managed network according to one example. Within the network configuration 100, a series of multi-mode mobile devices (a mobile device 102A, and a mobile device 102B) are arranged for communication with a carrier-managed network and with a D2D network. The carrier-managed network may operate in accordance with a 3GPP LTE/LTE-A or other suitable wireless wide area network (WWAN) protocol, and may include a configuration to provide wireless network communications from an eNodeB 104 in operation with an EPC 106, for communication of data to an IP network 108. The carrier network may be configured for facilitating network communications to the mobile device 102A and the mobile device 102B, using LTE/LTE-A communication links 112A, 112B respectively.

Communications between the mobile device 102A and the mobile device 102B are illustrated as facilitated via the IP network 108 through an infrastructure communication link 114. The infrastructure communication link 114 is established as the mobile device 102A and the mobile device 102B subscribe to a common carrier network and conduct communication with a common eNodeB 104. However, the infrastructure communication link 114 may also be established with use of separate eNodeBs or carrier networks.

D2D communications between the mobile device 102A and the mobile device 102B are facilitated through a D2D communication link 110. The D2D communication link 110 may utilize any number of WWAN, WLAN, or wireless personal area network (WPAN) protocols, such as a WLAN Wi-Fi direct network protocol (operating in accordance with a standard from the IEEE 802.11 standards family) or a WPAN Bluetooth protocol (operating in accordance with a Bluetooth standard as defined by the Bluetooth Special Interest Group). The D2D communication link 110 as shown may be configured for direct point-to-point connections between devices, but may also be facilitated through indirect peer-to-peer and multi-node connections.

Operations at the carrier network to establish the D2D communication link may be performed within systems of the carrier network, for example, within the EPC 106. The operations of the EPC 106 may include assisting discovery of the mobile device 102B from the perspective of the mobile device 102A, and assisting discovery of the mobile device 102A from the perspective of the mobile device 102B. For example, if the mobile device 102A suspects or is otherwise informed that the mobile device 102B is in proximity (e.g., is in communication range), or otherwise wishes to attempt a connection to the mobile device 102B, the mobile device 102A can request D2D discovery assistance from the EPC 106. As one example, the EPC 106 may perform operations to confirm with the mobile device 102B whether the device will allow the establishment of a D2D connection, and exchange information to assist D2D discovery and connection operations. As another example, the operator may also store these kinds of permissions in a database, and check them to see if the user has permitted access by another user before actually inquiring about permission. (A user may, for example, inform the network of these D2D permissions when it registers with the network). Thus, operations to confirm whether the establishment of the D2D connection is allowed may include a combination of policies or user interaction to verify the establishment of the D2D connection or certain D2D connection types.

Figure 2:
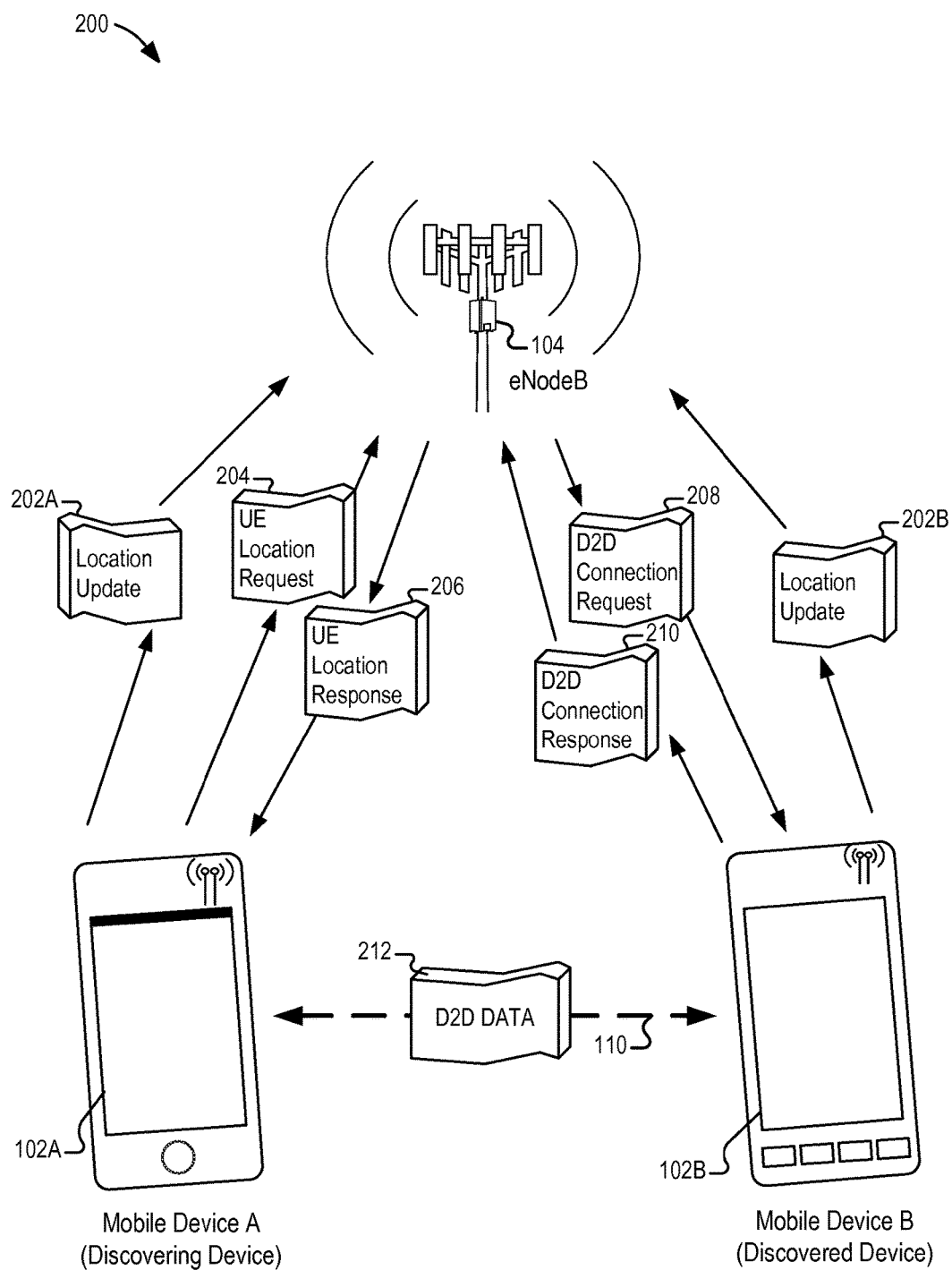
FIG. 2 illustrates data operations transmitted through an operator-managed network for establishing D2D communications between mobile devices according to a further described example.

FIG. 2 provides an illustration of example data operations 200 transmitted through a carrier-managed network for establishing a D2D communication link 110 between the mobile device 102A and the mobile device 102B according to an example. The mobile devices interface with the carrier-managed network through various communications with an eNodeB 104. As further described below and in reference to the operation flow and flowcharts of FIGS. 3-6, the data operations 200 transmitted within the carrier-managed network via the eNodeB 104 may include the exchange and coordination of various data updates, requests, and responses relevant to establishment of a D2D connection.

As illustrated in FIG. 2, a series of location update messages 202A, 202B may be provided from each of the mobile devices (the mobile device 102A, and the mobile device 102B). The location update messages 202A, 202B may be incorporated with existing location services or location management data managed by the carrier-managed network (or incorporated into location data communicated to the EPC 106). Location information from the location update messages 202A, 202B may be used by the carrier network, for example, to determine whether the mobile devices are in proximity to each other and are within range of establishing a D2D communication link 110. The location information from the location update messages 202A, 202B may also be coordinated in connection with location services (e.g., a location server) of the EPC 106 or another portion of the carrier-based network that tracks an approximate or precise location of the UEs.

The location information from the location update messages 202A, 202B may be used to detect and validate proximity of the pair of mobile devices within a communication range for establishing the D2D communication link 110. For example, as the mobile device 102A suspects that the mobile device 102B is in proximity (or otherwise decides to initiate a D2D connection to mobile device 102B), the mobile device 102A requests device discovery assistance from the operator network (e.g., EPC 106) for the mobile device 102B. The request for device discovery assistance may be sent from the mobile device 102A through one or more UE location requests 204 transmitted from the mobile device 102A to the operator network via the eNodeB 104.

In response to a UE location request such as the UE location request 204, the carrier-managed network may verify whether the mobile device 102B is discoverable (e.g., allowing others to discover it) or otherwise interested in establishing a D2D connection with the mobile device 102A. The verification may be performed by confirming D2D permissions in network-level databases (permissions can be established during UE registration or via earlier inquiries), or it may include the transmission of a D2D connection request 208 to the mobile device 102B, and the receipt of a D2D connection response 210 from the mobile device 102B. Operations such as user interface prompts or policy verifications may be performed at or on behalf of the mobile device 102B to obtain authorization to establish the D2D connection.

Once the carrier-managed network verifies permission for mobile device 102A to connect directly with mobile device 102B, the carrier-based network may provide one or both of the UEs with information to assist with the D2D connection establishment. For example, this may include device discovery information communicated to the mobile device 102A communicated in a UE location response 206 received from via eNodeB 104. This device discovery information may also include parameters of establishing the connection, such as a time period during which the discovery is valid.

During the time period in which the discovery is valid, the UE that initiates the D2D communication link 110 (the discovering UE, e.g., mobile device 102A) may perform discovery operations to locate and establish a connection to the discovered UE, assisted by the device discovery information obtained from the EPC 106. For example, UEs identified by the EPC 106 as located proximate to each other may be identified with a D2D communication protocol using standard network scanning procedures, such as with Bluetooth "device discovery" or Wi-Fi "P2P find" modes. In further examples, the UE location request 204 and the UE location response 206 may be used to obtain information about communication parameters, authentication information, security information, or other information used by a discovering device to locate and establish the connection to the discovered UE.

Figure 3:
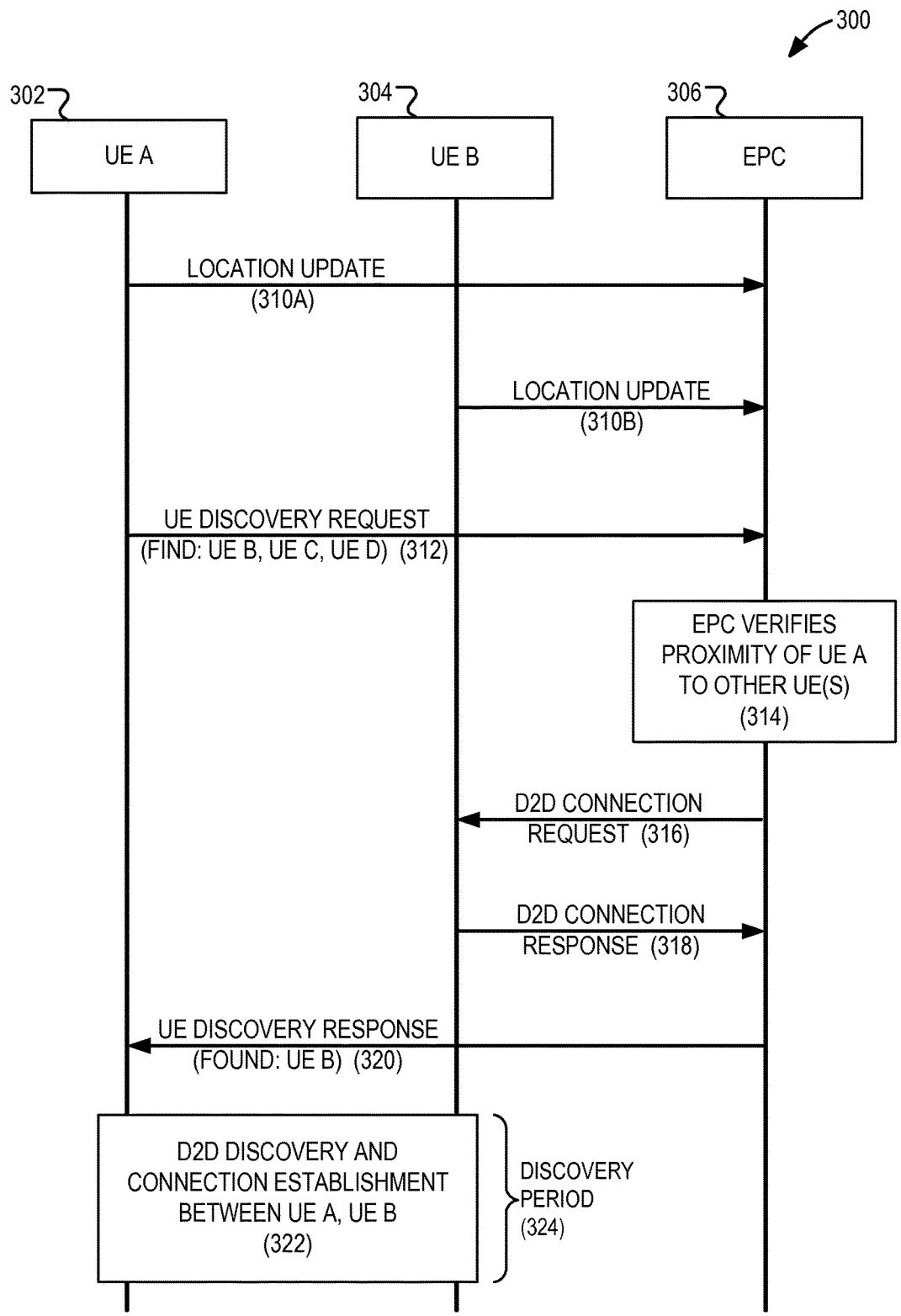
FIG. 3 illustrates a data sequence for establishing a D2D connection through a network operator according to a further described example.

FIG. 3 provides an example illustration of a data sequence 300 for establishing a D2D connection between a pair of user devices (a UE A 302 and a UE B 304), in coordination with data operations 200 of an EPC 306 managed by a network operator. The data sequence 300 is illustrated as providing for the establishment of a D2D connection between the UE A 302 and the UE B 304 when there is no pre-existing data flow or connection established through the EPC 306 between the pair.

First, the UE A 302 and the UE B 304 may perform intermittent location updates with the EPC 306 (operations 310A, 310B). The location updates enable the EPC 306 to be informed of the current location for each of the UE A 302 and the UE B 304. In some examples, information communicated in the location updates includes a position associated with a network coverage area, a position associated with a broader geographic area of the UE, or a specific determined geographical position. In other examples, the location updates include information related to the portion of the network in communication with the UE. Other techniques may be used to determine whether the UEs are not in proximity. For example, if the UE A 302 is attached to a PLMN that is not co-located with the PLMN that the UE B 304 is attached to, then the EPC 306 can conclude that the UEs are not in proximity for D2D communications.

Next, the EPC 306 receives a notification that the UE A 302 wants to communicate with the UE(s) listed in the message. This notification may occur via a direct request from the UE A 302, transmitted within a UE discovery request message (operation 312), or may occur via a high-level notification in the core network. This notification may indicate a one-time only event, or it may indicate to keep trying until some period of time lapses if a UE is not currently in proximity. The UE discovery request message may provide an indication to verify the location of one or more specific UEs, groups of UEs, or any D2D-capable UEs. For example, as illustrated in FIG. 3, the discovery request is issued for multiple UEs (UE B, UE C, UE D). The UE discovery request message may indicate whether the UE just wants to know if a specific UE (or type of UE) is in proximity, or whether the UE wants to receive assistance from the carrier network in the direct discovery process (for example, to obtain identification and common discovery period information for establishing the direct D2D communication link).

The EPC 306 checks if the UE A 302 is in proximity of any of the UEs in the notification (operation 314). Information obtained from the UE location updates (operations 310A, 310B) may be used by the EPC 306 for this determination. In other examples, the network operator may base proximity on whether UEs are associated with the same eNodeB or in communication with particular eNodeBs or network subsystems, for example.

In one scenario, the EPC 306 may check existing UE information databases to verify if UE A 302 can connect with the UEs it requested. In another scenario, a connection request and response exchange may be conducted between the EPC 306 and any potential device (e.g., the UE B 304) indicated for connection in the notification. This may include transmission of a D2D connection request (operation 316) to the UE B 304, requesting confirmation to attempt establishment of a D2D connection. The confirmation or denial to attempt establishment of a D2D connection may be indicated in a transmission of a D2D connection response (operation 318) returned to the EPC 306.

Having confirmed that the UE A 302 and the UE B 304 are in proximity, and that the connection request to the UE B 304 is confirmed, the EPC 306 transmits a UE discovery response (operation 320) to the discovering device (the UE A 302). The EPC 306 may also send the UE discovery response to UE B 304 so both UEs are informed to engage in discovery operations at a specific time, which device identifier to look for, and like discovery information. Thus, the UE discovery response may include mutual identifying information to enable the UE devices to find each other during a D2D discovery procedure. The UE discovery response may also include information related to a mutual or common discovery period, to expedite the discovery process or otherwise coordinate discovery timing. In some examples, the EPC 306 may first wait for the UE B 304 to confirm the D2D connection request (operation 318) before proceeding with sending the discovery information to the UE A 302; in other examples a policy-based determination may be made whether to confirm the D2D connection request on behalf of the UE B 304.

Using information obtained from the EPC 306, the UE A 302 and the UE B 304 perform operations to establish the D2D communication link (operation 322), including D2D discovery and connection establishment. The timing of the operations to establish the D2D communication link may be provided in connection with a discovery period 324. As suggested above, the EPC can coordinate the discovery timing and provide an indication of the discovery period 324 to the UE A 302 and the UE B 304; in other examples, the EPC 306 may first try to negotiate with each of the UEs to establish a mutual agreement for the discovery period 324. The discovery and connection establishment timing may be indicated by a start time, a start and finish time, or other signaling.

In connection with operation 322, the UEs attempt to discover each other and establish the D2D communication link during the proposed discovery period 324 using the identification information provided by the EPC 306. A failure to establish the communication link may be communicated to the EPC 306 (and used to obtain additional information to retry establishment of the D2D communication link), or connect to another UE.

Figure 4:
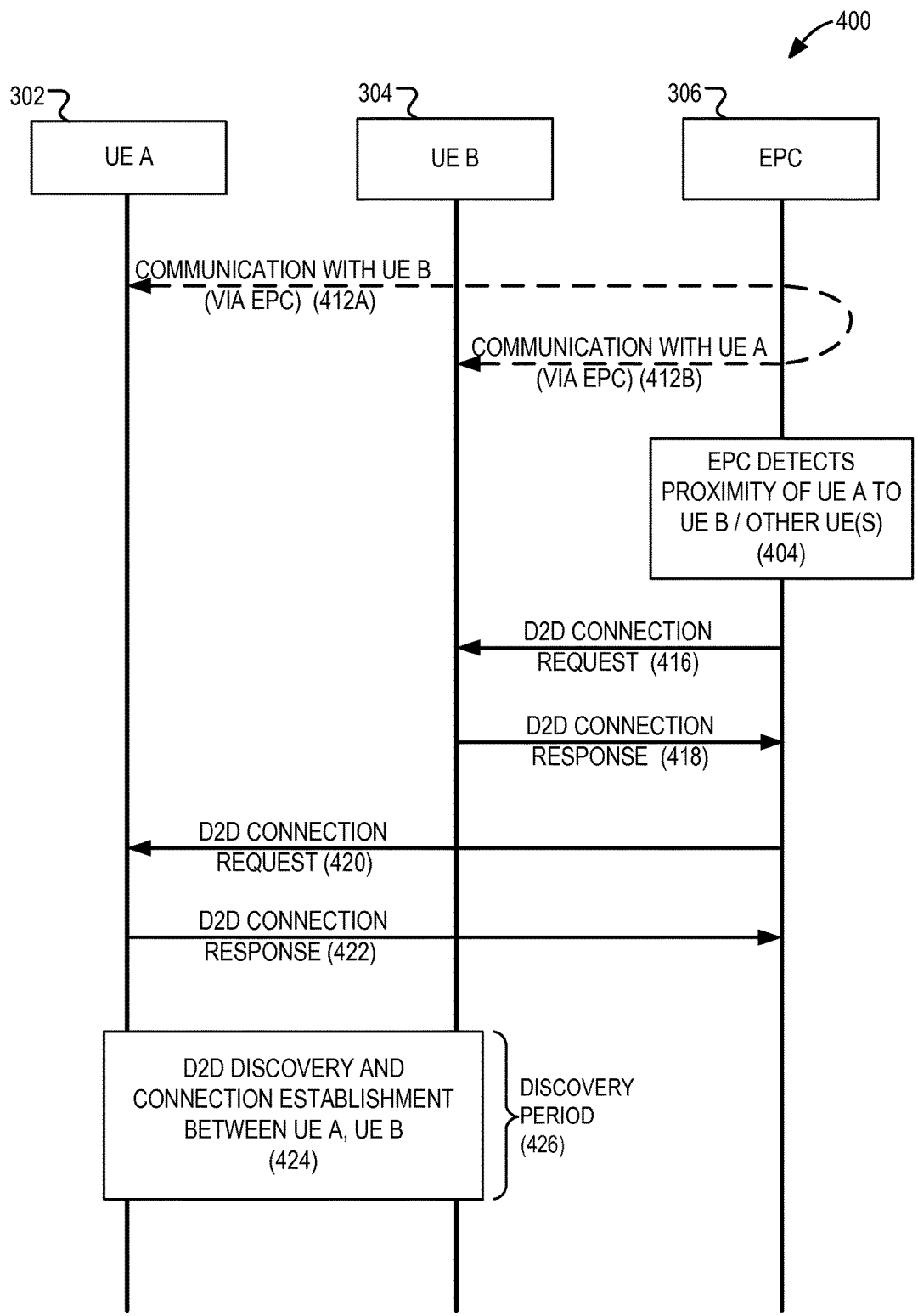
FIG. 4 illustrates a data sequence for establishing a D2D connection through a network operator between devices having an existing data flow according to a further described example.

FIG. 4 provides an example illustration of a data sequence 400 for establishing a D2D connection between the UE A 302 and the UE B 304, through an EPC 306 managed by a network operator, in a case where there is a pre-existing data flow between the UE A 302 and the UE B 304. The data sequence 400 is illustrated as providing for the establishment of a D2D connection between a device pair when there is a data flow or connection between the device pair facilitated through the EPC 306, through communication links with the UE A 412A and the UE B 412B.

FIG. 4 illustrates a scenario where the UEs move into D2D communication proximity as the UEs communicate with another UE (e.g., a pre-existing data flow). In this example, the UE A 302 is engaged in communication with the UE B 304, and the bearer path is established in an IP network via the infrastructure of the EPC 306.

The EPC 306 monitors the locations of the UEs to determine when and if they move into proximity. The location of the UE A 302 and the UE B 304 may be determined in connection with location measurements such as GPS sensors, proximity based on a common network attachment (such as when the two UEs are connected to the network via the same or co-located eNodeB), or any of the other location services and techniques discussed herein. Location monitoring operations may be autonomous, implemented by a network policy, or implemented per request by the UE(s)).

When the EPC 306 detects that the UE A 302 and the UE B 304 are in proximity, the EPC 306 provides the UEs with D2D connection requests. These connection requests include mutual identification information (to locate and connect to each other during the D2D connection discovery) and additional information such as a mutual/common discovery period (to expedite the discovery process). As shown, this may include the use of a D2D connection request (operation 416) provided to the UE B 304, followed by a D2D connection response (operation 418) provided from the UE B 304; this may also include the use of a D2D connection request (operation 420) provided to the UE A 302, with an accompanying D2D connection response (operation 422).

During a discovery period (period of time 426) indicated to the UE A 302 and to the UE B 304 (for example, in the respective D2D connection requests), the UEs attempt to discover each other and establish a D2D communication link (operation 424). The discovery and connection establishment operations at the UEs utilize the mutual identification information, authentication information, and other information provided by the EPC 306 (for example, in the respective D2D connection requests).

Figure 5:
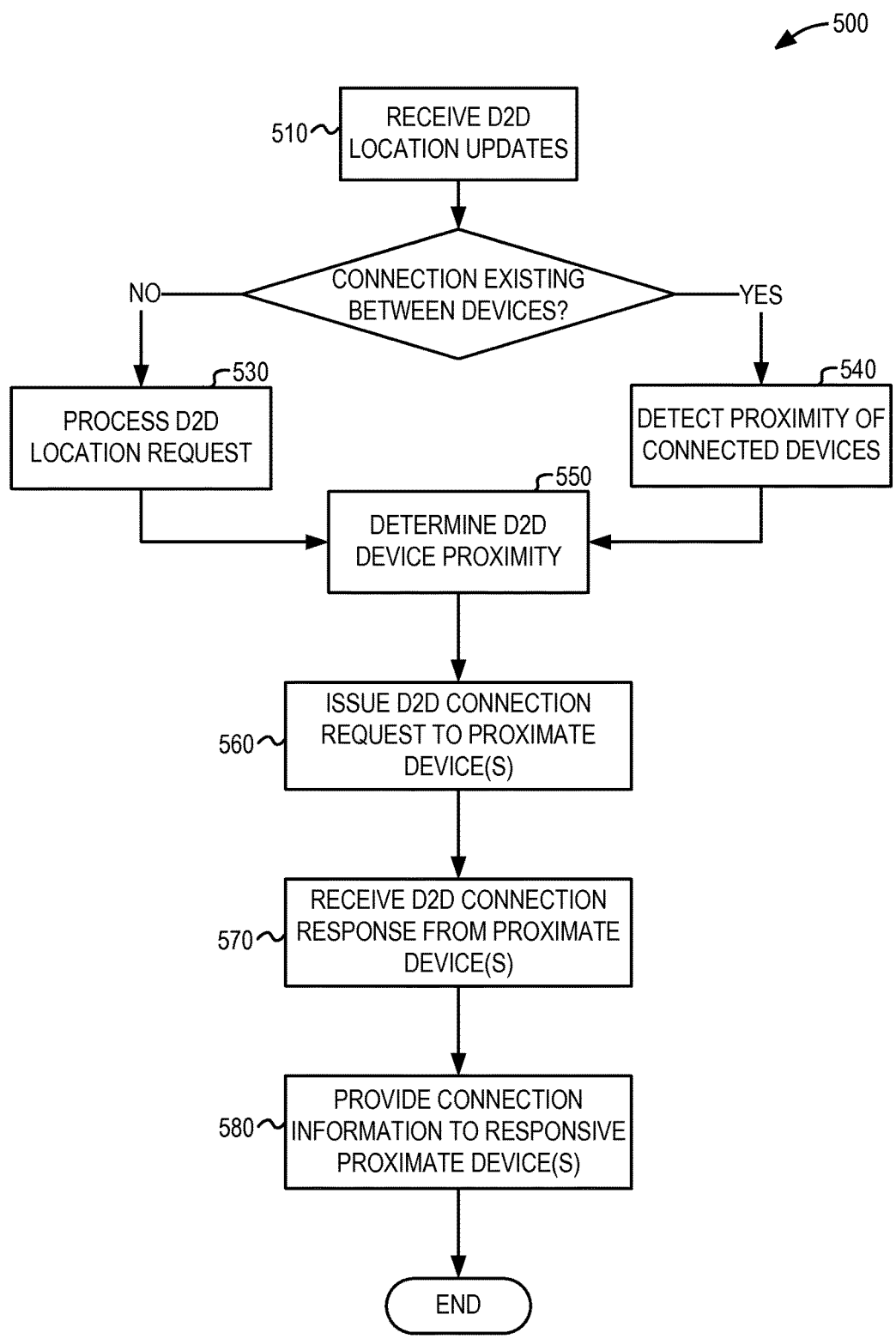
FIG. 5 illustrates a flowchart of an example operation flow performed at an evolved packet core for facilitating a D2D connection between connected UEs according to a further described example.

FIG. 5 provides an example illustration of an operation flow 500 performed at an EPC for initiating a D2D connection between identified UEs according to an example. At the EPC, various information related to the location and status of the UEs is managed. This information may be modified from the processing and extraction of received D2D location updates (operation 510).

If no data connection, facilitated by the EPC, exists between the UEs, then a request (e.g., a D2D location request) is handled by the EPC (operation 530) to trigger the operations for establishing a D2D communication link. If an existing data connection, facilitated by the EPC, exists between the UEs, then the proximity of the connected UEs is detected (operation 540) in order to trigger the operations for establishing a D2D communication link.

The D2D device proximity may be determined by the EPC (operation 550) to validate the precise location of discoverable devices. Upon a determination that a pair of UEs are in proximity for D2D communications, the EPC may issue a D2D connection request to the one or more proximate devices (operation 560) to obtain approval for establishment of the D2D connection(s). The D2D connection request may be provided to the discovered device (the device being requested), in cases where no connection exists between the devices. The D2D connection request may be provided to both devices in a case where a connection exists between the devices.

The response to the D2D connection request is received at the EPC from the proximate device(s) (operation 570). If this response is affirmative, then the EPC will provide information to the proximate device(s) to facilitate discovery, authentication, and establishment of the D2D communication link between the proximate devices (operation 580). This information may be communicated in one or more messages, or in response to specific queries from the UEs.

Figure 6:
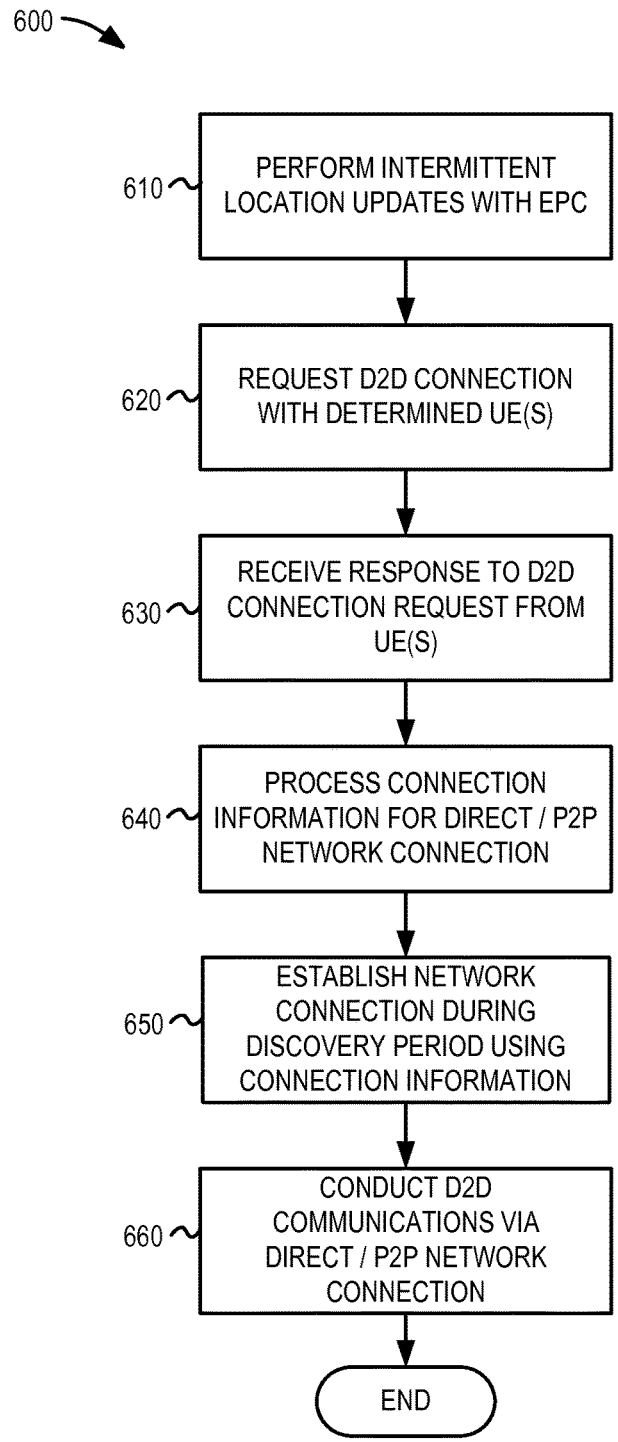
FIG. 6 illustrates a flowchart of an example operation flow performed at an UE for initiating a D2D connection to another UE using an evolved packet core according to a further described example.

FIG. 6 provides an example illustration of an operation flow 600 performed at a UE for initiating a D2D connection to another UE with assistance by an EPC of a carrier network according to an example. The operation flow 600, conducted by a discovering UE, may include performing intermittent location updates with the EPC (operation 610). These location updates may be provided in response to network operations at the UE. In other examples, the location updates may be provided to the EPC based on scheduled or predetermined intervals.

The discovering UE may request a D2D connection link to be established with one or more determined UEs (operation 620). The one or more determined UEs may include an identification of specific UEs (e.g., devices correlated with specific users, contacts, or identifiers and addresses), or an identification of any available UE satisfying a particular connection criterion. The discovering UE may receive a response message to the D2D connection request from the carrier network (operation 630), determined in response to connection request responses from various UEs or according to the parameters of the carrier network.

The response message from the carrier network indicating specific UEs available for connection may be followed by processing the connection information for the specific UEs (operation 640). This connection information is usable to establish the D2D communication link to the specific UEs, using a direct or P2P network connection. Other relevant information including an indication of a discovery or connection establishment period may be communicated in the response message.

The UEs may jointly or separately attempt to establish a D2D communication link to each other via the direct or P2P network connection initiated during the discovery period (operation 650). The connection establishment utilizes at least in part the connection information provided in the response message from the carrier network. Upon a successful establishment of the network connection, the D2D device may conduct D2D communications via the direct or indirect network connection to the connected devices (operation 660).

Although the preceding examples of D2D connections were provided with specific reference to 3GPP LTE/LTE-A and Wi-Fi (IEEE 802.11) communications, it will be understood that a variety of other WWAN, WLAN, and WPAN protocols and standards may be used in connection with the techniques described herein. These standards include, but are not limited to, standards from 3GPP (e.g., LTE, LTE-A, HSPA+, UMTS), IEEE 802.11 (e.g., 802.11a, 802.11b, 802.11g, 802.11n, 802.11ac), 802.16 (e.g., 802.16p), or Bluetooth (e.g., Bluetooth 4.0, or other standard defined by the Bluetooth Special Interest Group) standards families. Bluetooth, as used herein, may refer to a short-range digital communication protocol defined by the Bluetooth Special Interest Group, the protocol including a short-haul wireless protocol frequency-hopping spread-spectrum (FHSS) communication technique operating in the 2.4 GHz spectrum. Other communication standards capable of facilitating device-to-device, machine-to-machine, and P2P communications may be used in connection with the presently described techniques. Further, although the preceding examples of the carrier network were provided with specific reference to a 3GPP LTE/LTE-A cellular RAN and an EPC, it will be understood that other wide area network protocols and system configurations may be used in connection with the techniques described herein.

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
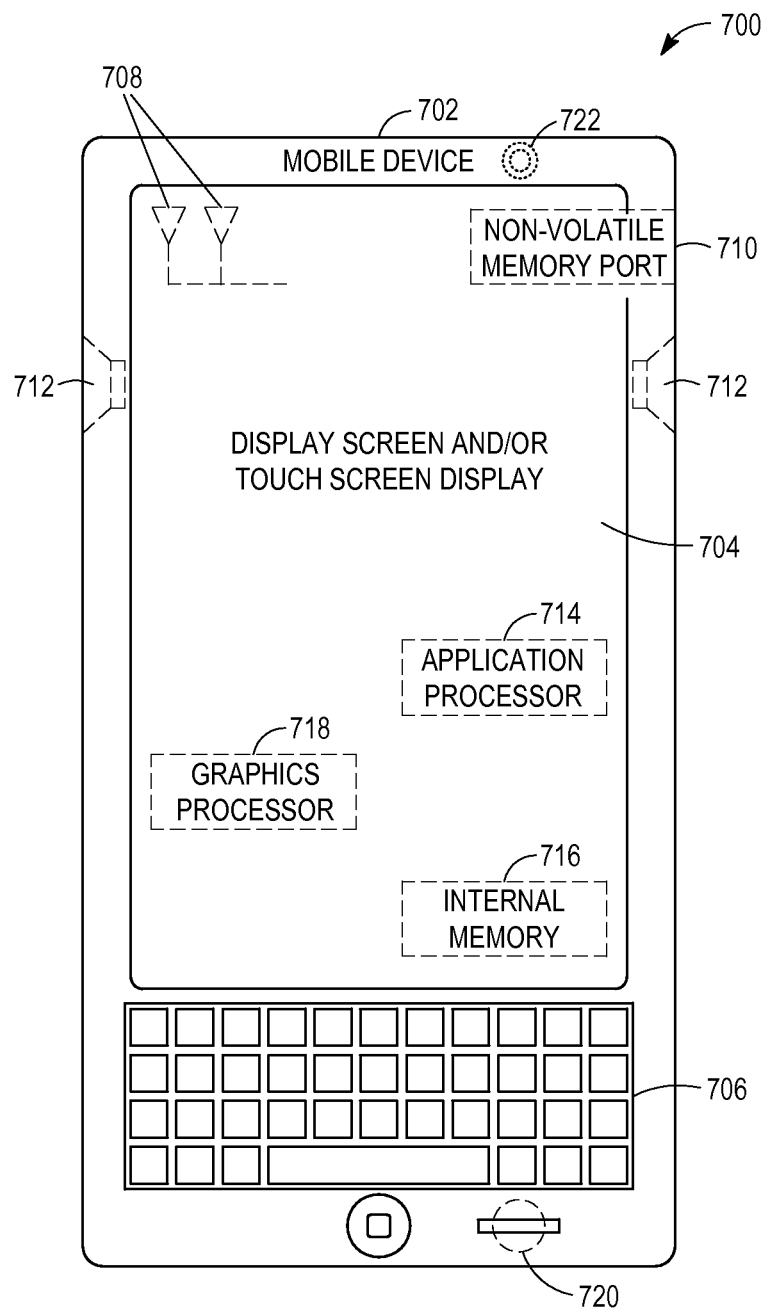
FIG. 7 illustrates an example mobile device on which the configurations and techniques described herein may be deployed.

FIG. 7 provides an example illustration of a mobile device 700, such as a user equipment (UE), a mobile station (MS), a mobile wireless device, a mobile communication device, a tablet, a handset, or other type of mobile wireless device. The mobile device 700 may include one or more antennas 708 within housing 702 that are configured to communicate with a base station (BS), an eNodeB, or other type of wireless wide area network (WWAN) access point. The mobile device may be configured to communicate using at least one wireless communication standard including 3GPP LTE, WiMAX, High Speed Packet Access (HSPA), Bluetooth, and Wi-Fi. The mobile device 700 may communicate using separate antennas for each wireless communication standard or shared antennas for multiple wireless communication standards. The mobile device 700 may communicate in a WLAN, a WPAN, and/or a WWAN.

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen. A camera 722 located on the front (display screen) side or the rear side of the mobile device 700 may also be integrated into the housing 702 of the mobile device 700.

Figure 8:
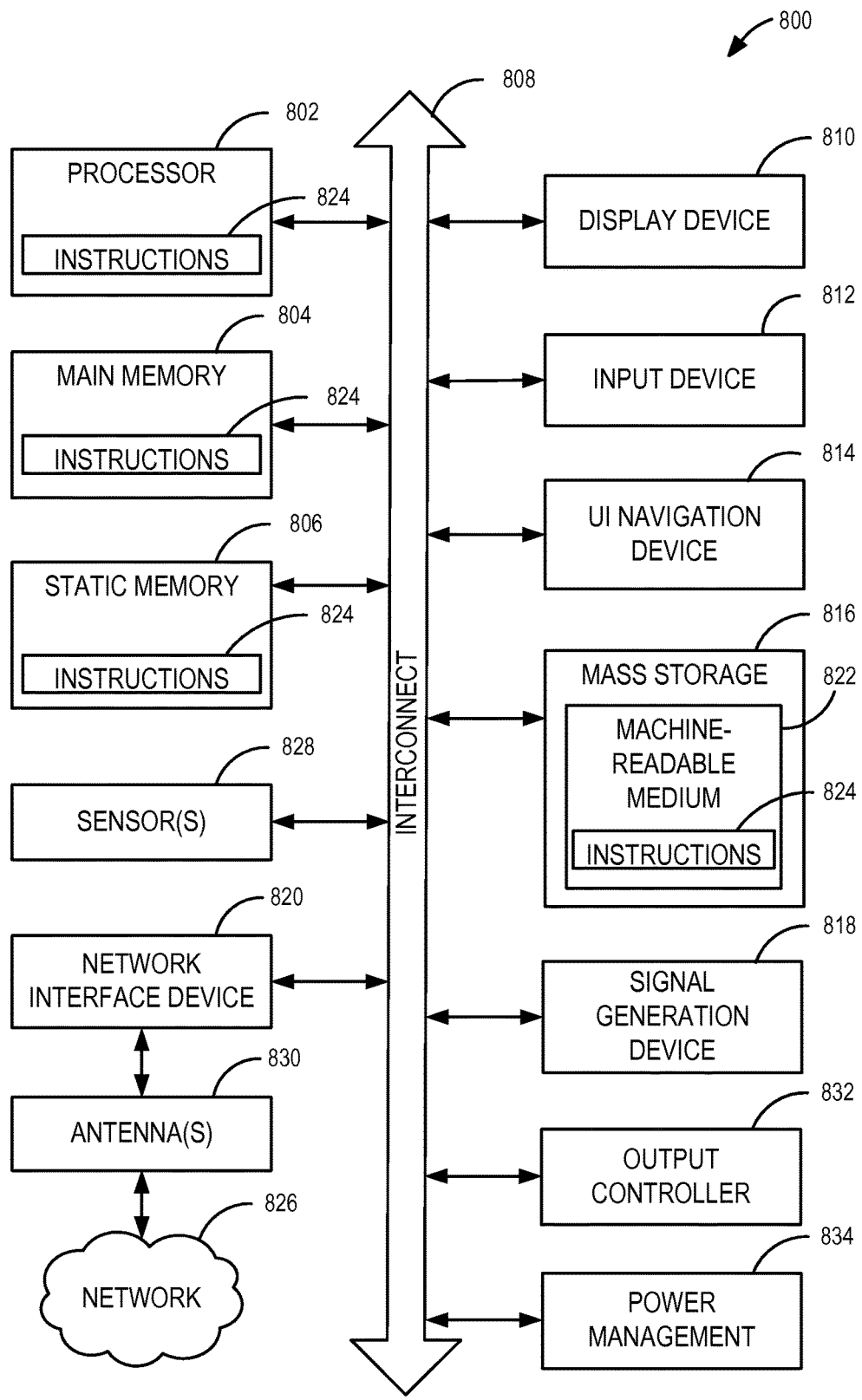
FIG. 8 illustrates an example computer system that may be used as a computing platform for the computing or networking devices described herein.

FIG. 8 is a block diagram illustrating an example computer system machine upon which any one or more of the methodologies herein discussed may be run. Computer system 800 may be embodied as the computing device 104, mobile device 106, mobile device 700 (from FIGS. 1 and 7), or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a GPS sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a method performed by a device (e.g., a user equipment (UE)) for establishing a device-to-device wireless connection with network assistance, comprising: providing location information of the UE to an Evolved Packet Core (EPC) of a first wireless network, the first wireless network being one of 3GPP Long Term Evolution or a 3GPP Long Term Evolution-Advanced (LTE/LTE-A) wireless network, the UE in communication with the EPC; providing device-to-device connection information to the EPC for connection with a second UE, to establish a device-to-device wireless connection between the UE and the second UE, the second UE in communication with the EPC; and performing discovery of the second UE using a device-to-device communication transmitted via a second wireless network, based on a response from the EPC to establish the device-to-device wireless connection with the second UE.

In Example 2, the subject matter of Example 1 can optionally include conducting communications over the device-to-device wireless connection between the UE and the second UE.

In Example 3, the subject matter of one or any combination of Examples 1-2 can optionally include providing device-to-device connection information to the EPC by transmitting a request to establish the device-to-device wireless connection from the UE to the EPC.

In Example 4, the subject matter of one or any combination of Examples 1-3 can optionally include providing location information of the UE to the EPC being conducted at a predefined interval, wherein the location information includes data associated with a geographic area of a known location of the UE.

In Example 5, the subject matter of one or any combination of Examples 1-4 can optionally include the device-to-device connection information including a location request indicating one or a plurality of UEs for which the UE requests to connect.

In Example 6, the subject matter of one or any combination of Examples 1-5 can optionally include the response from the EPC to establish the device-to-device wireless connection being provided from the EPC in response to the EPC verifying proximity of the UE to the second UE, wherein proximity of the UE is determined at least in part by a connection of the UE and the second UE to a common evolved Node B (eNodeB).

In Example 7, the subject matter of one or any combination of Examples 1-6 can optionally include the device-to-device communication being transmitted from the wireless device to the second wireless device to establish the direct device-to-device wireless connection, the direct device-to-device wireless connection performing communications in accordance with a standard from: a LTE/LTE-A standards family, an IEEE 802.11 standards family, an IEEE 802.16 standards family, or a Bluetooth Special Interest Group standards family.

Example 8 can include, or can optionally be combined with all or portions of the subject matter of one or any combination of Examples 1-7 to include the subject matter embodied by a wireless communication device such as a user equipment (UE), comprising: a multi-mode transceiver comprising circuitry arranged to perform wireless communications with an evolved NodeB (eNB) in a 3GPP Long Term Evolution or a 3GPP Long Term Evolution-Advanced (LTE/LTE-A) network via a LTE/LTE-A network connection and with a second UE via a device-to-device connection, the circuitry further arranged to facilitate the device-to-device connection for direct communications between the UE and a second UE, by performing operations to: transmit, to an evolved packet core (EPC) in communication with the LTE/LTE-A network, location data of the UE according to a predetermined timing; transmit, to the EPC, a device-to-device connection request, the device-to-device connection request including an identification of the second UE, the second UE having an network connection established to the LTE/LTE-A network; receive, from the EPC, a device-to-device connection response, the device-to-device connection response including connection information for the second UE and timing information for performing discovery of the second UE; and transmit, to the second UE during a connection establishment period determined using the timing information, one or more device-to-device communications to establish the device-to-device connection using the connection information for the second UE.

In Example 9, the subject matter of Example 8 can optionally include the circuitry further arranged to directly transmit and receive, with the second UE, device-to-device data via the device-to-device connection in response to successful discovery and authentication of the second UE during the connection establishment period.

In Example 10, the subject matter of one or any combination of Examples 8-10 can optionally include the location data of the UE being transmitted to the EPC at a predefined interval, wherein the location data includes a determined geographical position of the UE.

In Example 11, the subject matter of one or any combination of Examples 8-10 can optionally include the device-to-device connection request transmitted to the EPC including an identification of a plurality of UEs for attempting a device-to-device connection, the plurality of UEs including the second UE.

In Example 12, the subject matter of one or any combination of Examples 8-11 can optionally include a display screen, wherein operations to facilitate the device-to-device communications between the UE and the second UE include providing one or more interactive displays on a user interface presented via the display screen, to enable user control of establishment for the device-to-device connection.

In Example 13, the subject matter of one or any combination of Examples 8-12 can optionally include the multi-mode transceiver being further arranged to perform the device-to-device communications via a wireless network distinct from the LTE/LTE-A network, wherein the device-to-device communications are performed between the UE and the second UE in connection with a standard from: a LTE/LTE-A standards family, an IEEE 802.11 standards family, an IEEE 802.16 standards family, or a Bluetooth Special Interest Group standards family.

Example 14 can include, or can optionally be combined with all or portions of the subject matter of one or any combination of Examples 1-14 to include the subject matter embodied by a method performed by a performed by a device (e.g., a user equipment (UE)) for facilitating a data flow via a direct device-to-device connection established between the UE and a second UE, comprising: receiving a request for establishing a device-to-device connection to the second UE, the request including an identification of the second UE, and an identification of a discovery period, the request provided from an evolved packet core (EPC) of a 3GPP Long Term Evolution or 3GPP Long Term Evolution-Advanced (LTE/LTE-A) network in response to detection of proximity of the UE to the second UE; transmitting a response, to the EPC, to the request for establishing a device-to-device connection to the second UE; and establishing the device-to-device connection to the second UE during the discovery period, using the identification of the second UE, wherein a data flow between the UE and the second UE via the device-to-device connection is established to replace a data flow between the UE and the second UE existing via the EPC.

In Example 15, the subject matter of Example 14 can optionally include a second request for establishing a device-to-device connection being transmitted to the second UE from the EPC, the second request including an identification of the first UE, wherein the first UE and the second UE perform operations for establishing the device-to-device connection in response to an affirmative response to the second request for establishing a device-to-device connection.

In Example 16, the subject matter of one or any combination of Examples 14-15 can optionally include the identification of the first UE including information used to discover and authenticate with the first UE from the second UE, and wherein the identification of the second UE includes information used to discover and authenticate with the second UE from the first UE.

In Example 17, the subject matter of one or any combination of Examples 14-16 can optionally include the detection of proximity of the UE to the second UE being based on a connection of the UE and the second UE to a common evolved NodeB (eNodeB) in the LTE/LTE-A network.

In Example 18, the subject matter of one or any combination of Examples 14-17 can optionally include the detection of proximity of the UE to the second UE being based on locations of the UE and the second UE determined by the EPC in comparison to a maximum communication range of the device-to-device connection.

Example 19 can include, or can optionally be combined with all or portions of the subject matter of one or any combination of Examples 1-18 to include the subject matter embodied by a evolved packet core (EPC), the EPC arranged to operate processing components of a 3GPP Long Term Evolution or a 3GPP Long Term Evolution (LTE/LTE-A)

wireless network, the LTE/LTE-A wireless network arranged to establish LTE/LTE-A network communication links with a first user equipment (UE) and a second UE via one or more evolved NodeBs (eNodeBs), and the EPC including one or more components arranged to facilitate an establishment of a device-to-device communication link between the first UE and a second UE over a second wireless network, by performing operations to: determine an establishment of the LTE network communication link between the first UE and the second UE; determine proximity between the first UE and the second UE; and transmit identification information and a discovery timing via the LTE/LTE-A wireless network to the first UE and to the second UE, for use in the establishment of the device-to-device communication link via the second wireless network.

In Example 20, the subject matter of Example 19 can optionally include determining proximity between the first UE and the second UE being performed based on location information of the first UE and the second UE communicated to the EPC.

In Example 21, the subject matter of one or any combination of Examples 19-20 can optionally include the establishment of the device-to-device communication link being commenced in response to a notification provided within the EPC, or from a notification provided from the first UE.

In Example 22, the subject matter of one or any combination of Examples 19-21 can optionally include operations to determine an establishment of the device-to-device communication link between the first UE and the second UE being performed in response to receiving a device-to-device connection request from the first UE, the device-to-device connection request from the first UE including an identification of the UE; wherein operations to transmit identification information and a discovery timing via the LTE wireless network to the first UE and the second UE include: issuing a second device-to-device connection request to the second UE from the EPC, the second device-to-device connection request including the identification information and the discovery timing, and the identification information including an identification of the first UE; and in response to a confirmation to the second device-to-device connection request, issuing a device-to-device connection response to the first UE.

In Example 23, the subject matter of one or any combination of Examples 19-22 can optionally include the identification information provided to the first UE including authentication information to authenticate with the second UE using device-to-device communications transmitted via the second wireless network, and wherein the identification information provided to the second UE includes authentication information to authenticate with the first UE using device-to-device communications transmitted via the second wireless network.

In Example 24, the subject matter of one or any combination of Examples 19-23 can optionally include the device-to-device communications being performed between the wireless communication device and the second wireless communication device in the second wireless network in connection with use of a standard from: a 3GPP Long Term Evolution or Long Term Evolution-Advanced standards family, an IEEE 802.11 standards family, an IEEE 802.16 standards family, or a Bluetooth Special Interest Group standards family.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-transitory computer-readable storage medium that stores instructions for execution by one or more processors to:
   receive proximity-based service registration requests from a first user equipment (UE) and a second UE of a first wireless network;
   receive a proximity request from the first UE, the proximity request comprising a request for notification when the second UE is proximate to the first UE for direct communication with the second UE via a second wireless network different than the first wireless network, wherein the proximity request received from the first UE comprises a first hypertext transfer protocol (HTTP) message;
   receive UE location information from the first UE and the second UE;
   detect when the second UE is proximate to the first UE based, at least in part, on the received UE location information from the first UE and the second UE; and
   in response to a detection that the second UE is proximate to the first UE, transmit an alert to the first UE as a response to the received proximity request, wherein the alert transmitted to the first UE comprises a second HTTP message.

2. The non-transitory computer-readable storage medium of claim 1, further comprising instructions for execution by one or more processors to:
   store proximity-based service context data for the first UE and the second UE.

3. The non-transitory computer-readable storage medium of claim 2, further comprising instructions for execution by one or more processors to:
   receive a request from at least one of the first UE or the second UE to de-register from the proximity-based service; and
   remove the stored proximity-based service context data for the respective UE.

4. The non-transitory computer-readable storage medium of claim 1, wherein the second wireless network comprises at least one of a wireless local area network (WLAN) or a wireless personal area network (WPAN).

5. The non-transitory computer-readable storage medium of claim 4, further comprising instructions for execution by one or more processors to:
   transmit a WLAN peer-to-peer (P2P) device identifier for the second UE to the first UE.

6. The non-transitory computer-readable storage medium of claim 1, further comprising instructions for execution by one or more processors to:
   receive intermittent UE location information updates from the first UE and the second UE; wherein the second UE is detected as proximate to the first UE based, at least in part, plurality of received intermittent UE location information updates from the second UE.

7. The non-transitory computer-readable storage medium of claim 1, wherein the proximity request received from the first UE comprises a time limit associated with the request, and wherein the alert is transmitted to the first UE in response to the detection that the second UE is proximate to the first UE during the time limit associated with the request.

8. Processing circuitry comprising:
   location detection circuitry to detect whether a first user equipment (UE) and a second UE of a first wireless network are proximate based, at least in part, on received UE location information from the first UE and the second UE;
receiver circuitry to:
  receive proximity-based service registration requests from the first UE and the second UE;
  receive UE location information from the first UE and the second UE; and
  receive a proximity request from the first UE, the proximity request comprising a request for notification when the second UE is proximate to the first UE for direct communication with the first UE via a second wireless network, wherein the proximity request received from the first UE comprises a first hypertext transfer protocol (HTTP) message; and
transmission circuitry to, in response to a detection that the second UE is proximate to the first UE, transmit an alert to the first UE as a response to the received proximity request, wherein the alert transmitted to the first UE comprises a second HTTP message.

9. The processing circuitry of claim 8, further comprising:
proximity-based service memory circuitry to store proximity-based service context data for the first UE and the second UE.

10. The processing circuitry of claim 9, wherein the receiver circuitry is to further receive a request from at least one of the first UE or the second UE to de-register from the proximity-based service, and the proximity-based service memory circuitry is to further remove the stored proximity-based service context data for the respective UE.

11. The processing circuitry of claim 8, wherein the second wireless network comprises at least one of a wireless local area network (WLAN) or a wireless personal area network (WPAN).

12. The processing circuitry of claim 11, wherein the transmission circuitry is to further transmit a WLAN peer-to-peer (P2P) device identifier for the second UE to the first UE.

13. The processing circuitry of claim 8, wherein the receiver circuitry is to further receive intermittent UE location information updates from the first UE and the second UE; wherein the second UE is detected as proximate to the first UE based, at least in part, plurality of received intermittent UE location information updates from the second UE.

14. The processing circuitry of claim 8, wherein the proximity request received from the first UE comprises a time limit associated with the request, and wherein the alert is transmitted to the first UE in response to the detection that the second UE is proximate to the first UE during the time limit associated with the request.

15. The processing circuitry of claim 8, wherein the location detection circuitry, the receiver circuitry, and the transmission circuitry are included in one or more devices of an evolved packet core (EPC) of the first wireless network.

16. An apparatus for a user equipment (UE) comprising:
one or more processors; and
software to be executed via the one or more processors to:
  transmit a registration request to a proximity-based service function of a wireless network;
  transmit a proximity request to the proximity-based service function, the proximity request comprising a request for notification when a second UE is proximate to the UE for direct communication with the second UE via a wireless local area network (WLAN);
  receive a response from the proximity-based service function, the response comprising an alert that the second UE is proximate to the UE and a WLAN peer-to-peer (P2P) device identifier for the second UE; and
  establish a WLAN P2P connection with the second UE using the WLAN P2P identifier for the second UE.

17. The apparatus of claim 16, wherein the software is to further de-register from the proximity-based service function.

18. The apparatus of claim 16, wherein the software is to further transmit intermittent UE location information updates to the proximity-based service function.

19. The apparatus of claim 16, wherein the proximity request transmitted to the proximity-based service function and the response received from the proximity-based service function comprise hypertext transfer protocol (HTTP) messages.

20. The apparatus of claim 16, wherein the proximity request transmitted to the proximity-based service function comprises a time limit associated with the request to receive a response from the proximity-based service function.

21. The apparatus of claim 16, wherein the proximity request comprises a request for notification when any of a plurality of UEs, including the second UE, is proximate to the UE for direct communication via the WLAN.

* * * * *